United States Patent [19]

Epperly et al.

[11] Patent Number: 4,830,839

[45] Date of Patent: May 16, 1989

[54] AMMONIA SCRUBBING

[75] Inventors: William R. Epperly, New Canaan, Conn.; Jeremy D. Peter-Hoblyn, Cornwell, England; James C. Sullivan, Westport, Conn.

[73] Assignee: Fuel Tech, Inc., Stamford, Conn.

[21] Appl. No.: 132,801

[22] Filed: Dec. 14, 1987

Related U.S. Application Data

[63] Continuation-in-part of Ser. No. 50,198, May 14, 1987, Pat. No. 4,780,289.

[51] Int. Cl.$^4$ .......................... C01B 21/00; B01J 8/00
[52] U.S. Cl. ..................................... 423/235; 423/239
[58] Field of Search ................... 423/239, 239 A, 237, 423/238, 235, 235 D

[56] References Cited

U.S. PATENT DOCUMENTS

| | | | |
|---|---|---|---|
| 3,900,554 | 8/1975 | Lyon | 423/235 |
| 4,115,515 | 9/1978 | Tennor et al. | 423/235 |
| 4,213,944 | 7/1980 | Azuhata et al. | 423/235 |

Primary Examiner—Gregory A. Heller
Attorney, Agent, or Firm—St. Onge Steward Johnston & Reens

[57] ABSTRACT

This invention presents a process for performing ammonia scrubbing. More particularly, the present invention comprises a process in which a non-nitrogenous treatment agent is introduced into the effluent so as to interact with ammonia present in the effluent under conditions effective to perform ammonia scrubbing, i.e., at least partially rid the effluent of ammonia.

25 Claims, No Drawings

AMMONIA SCRUBBING

DESCRIPTION

RELATED APPLICATION

This application is a continuation-in-part of copending and commonly owned U.S. patent application entitled "Process for Nitrogen Oxides Reduction and Minimization of the Production of Other Pollutants" having Ser. No. 050,198, filed in the names of Epperly, O'Leary and Sullivan on May 14, 1987, now U.S. Pat. No. 4,780,289; copending and commonly assigned U.S. patent application entitled "Multi-Stage Process for Reducing the Concentration of Pollutants in an Effluent", Ser. No. 022,716, filed in the names of Epperly, Peter-Hoblyn, Shulof, Jr. and Sullivan on Mar. 6, 1987, now U.S. Pat. No. 4,777,024; and copending and commonly assigned U.S. patent application entitled "Process for the Reduction of Nitrogen Oxides in an Effluent" having Ser. No. 014,431, filed in the names of Epperly and Sullivan on Feb. 13, 1987 now U.S. Pat. No. 4,770,863, the disclosures of which are incorporated herein by reference.

TECHNICAL FIELD

The present invention relates to a process for reducing the concentration of ammonia in the effluent from the combustion of a carbonaceous fuel, especially in a process which concomitantly reduces the level of nitrogen oxides in the effluent. Preferably, the effluent is the oxygen-rich effluent from the combustion of a carbonaceous fuel.

Carbonaceous fuels can be made to burn more completely, and with reduced emissions of carbon monoxide and unburned hydrocarbons, when the oxygen concentrations and air/fuel ratios employed are those which permit high flame temperatures. When fossil fuels are used to fire large utility boilers, temperatures above about 2000° F. and typically about 2200° F. to about 3000° F. are generated. Unfortunately, such high temperatures, as well as hot spots of higher temperatures, tend to cause the production of thermal $NO_x$, the temperatures being so high that free radicals of oxygen and nitrogen are formed and chemically combine as nitrogen oxides. Even in circulating fluidized bed boilers that operate at temperatures of 1300° F. to 1600° F., significant amounts of nitrogen oxides can be formed.

Unfortunately, in addition to the fact that nitrogen oxides are troublesome pollutants themselves, most common $NO_x$ reducing processes lead to the presence of ammonia in the effluent as a byproduct or as unused treatment agent. Additionally, ammonia is often produced as a product of the combustion of carbonaceous fuels even without nitrogen oxides-reducing treatment of the resulting effluent. Ammonia is often considered as undesirable an effluent constituent as nitrogen oxides. Several states and localiiies have adopted laws and/or regulations which severely limit the amount of ammonia permitted in the combustion effluent streams of large utility and circulating fluidized bed boilers.

BACKGROUND ART

Many different processes and composttions have been proposed for chemically reducing ammonia levels in an effluent, including catalytic and non-catalytic processes as well as thermal processes. Typical of catalytic processes is that disclosed by Kimura et al. in U.S. Pat. No. 4,233,275. The Kimura et al. process involves the decomposition of ammonia by a reduced iron catalyst in a process for purifying a high pressure raw coal gas. In a somewhat similar non-catalytic process, Dean, in U.S. Pat. No. 4,423,017, teaches the decomposition of ammonia in a combustion effluent by contacting the effluent with a metallic material such as iron-, nickel- and cobalt-based alloys, within a gas residence time zone of less than one second from the ammonia source.

Azuhata et al. disclose another non-catalytic process for the decomposition of ammonia in U.S. Pat. No. 4,213,944 by teaching the addition of hydrogen peroxide to a combustion effluent to which ammonia is added to reduce the nitrogen oxides concentration of the effluent.

Representative of thermal processes for ammonia decomposition are those disclosed by Palm et al. in U.S. Pat. No. 4,391,790 and McGill et al. in U.S. Pat. No. 4,519,993. Palm et al. disclose the decomposition of ammonium compounds deposited on a catalyst are removed by passing a regeneration stream in contact with the catalyst for produce an ammonia containing regeneration stream and combusting the regeneration stream at high temperatures (i.e., 2400° F. to 2600° F.). McGill et al. disclose a process wherein an effluent is contacted with an effective amount of oxygen containing gas and a stoichiometric amount of a hydrocarbon at a temperature of greater than 2000° F. to decompose ammonia.

Tenner et al., in U.S. Pat. No. 4,115,515, disclose the reduction of nitrogen oxides by injecting ammonia, with or without an additional reducing composition. In a specific embodiment of Tenner et al., ammonia is introduced into the effluent at 900° to 1000° C. to reduce nitrogen oxides in the effluent and hydrogen is injected into the effluent at 700° to 900° C. to combine with "unconverted" ammonia to maximize the $NO_x$ reductions achievable with the Tenner et al. process.

What is needed is a non-catalytic process for substantially reducing the concentration of ammonia in an effluent, preferably as an adjunct to a process for reducing the concentration of nitrogen oxides in the effluent.

DISCLOSURE OF INVENTION

This invention relates to a process for reducing the concentration of ammonia in the effluent from the combustion of a carbonaceous fuel. The primary objective of the invention is to minimize the effluent ammonia level.

Another objective of the present invention is to maintain the ammonia level in the effluent at no more than a predetermined desired level.

Yet another objective of the present invention is to either minimize the effluent ammonia level or maintain the effluent ammonia level below a predetermined level while concomitantly reducing the nitrogen oxides level in the effluent.

These and other objectives which will become apparent upon reading this description can be attained by the practice of the present invention which comprises introducing a non-nitrogenous treatment agent into an effluent from the combustion of a carbonaceous fuel under conditions effective to perform ammonia scrubbing, i.e., to reduce the level of ammonia in the effluent.

In a highly preferred embodiment, this invention comprises a process which serially treats the effluent from the combustion of a carbonaceous fuel by introducing nitrogenous treatment agents at one or more locations to reduce the concentration of nitrogen oxides in the effluent and then introducing a non-nitrogenous treatment agent into the effluent under conditions effective to perform ammonia scrubbing.

In the most preferred embodiment, a nitrogenous treatment agent, either alone or in combination with an enhancer therefor, is introduced into the effluent at a first temperature zone and a non-nitrogenous treatment agent is introduced into the effluent at a second temperature zone so as to combine with ammonia generated by or present after the introduction of the nitrogenous treatment agent on the right side of the non-nitrogenous treatment agent/ammonia nitrogen oxides reduction versus effluent temperature curve and thereby perform ammonia scrubbing while also achieving further nitrogen oxides reduction. The term "treatment agent" as used in this description should be understood to refer to a composition comprising a chemical capable of reducing ammonia, $NO_x$, or other pollutants, and, preferably, a solvent. The composition of each treatment agent is formulated to be effective at reducing the concentration of the target pollutant such as ammonia or $NO_x$ in the effluent when introduced into the effluent at the designated temperature zone.

The term "treatment regimen" as used herein refers to the introduction (such as by injection) of a treatment agent into an effluent and the conditions under which the treatment agent is introduced, such as treatment agent components (by which is meant the ingredients or chemical formulation of the treatment agent), treatment agent dilution (by which is meant the concentration of treatment agent components when the treatment agent comprises a solution), relative presence of treatment agent components (by which is meant the relative weight ratio or fractions of the components which form the chemical formulation which made up the treatment agent), etc.

The present invention generally comprises introducing a non-nitrogenous treatment agent into the effluent from the combustion of a carbonaceous fuel to perform ammonia scrubbing. The non-nitrogenous treatment agent preferably comprises a hydrocarbon. The most preferred hydrocarbons suitable for use are oxygenated hydrocarbons such as ketones, aldehydes, esters, ethers, organic acids and salts thereof, sugars, furfural and furfural derivatives and mono, di or polyhydric alcohols of aliphatic hydrocarbons. Ethylene glycol, molasses, methanol, furfural, sugar, acetone, methylethyl ketone and glycerol are preferred oxygenated hydrocarbons for this purpose, with an ethylene glycol/molasses mixture being most preferred. Mixtures of polyols, such as those mixtures of low molecular weight polyols known as hydrogenated starch hydrosylates, can also be advantageously employed. Additional hydrocarbons which are suitable for use in the present invention include paraffinic, olefinic and aromatic hydrocarbons, including naphtha-based hydrocarbons, and mixtures thereof.

Suitable non-nitrogenous treatment agents include the non-nitrogenous treatment agents disclosed by copending and commonly assigned U.S. patent application entitled "Reduction of Nitrogen-Based Pollutants Through the Use of Urea Solutions Containing Oxygenated Hydrocarbon Solvents", Ser. No. 784,828, filed in the name of Bowers on Oct. 4, 1985 now U.S. Pat. No. 4,719,092; copending and commonly assigned U.S. patent application entitled "Process for the Reduction of Nitrogen Oxides in an Effluent", Ser. No. 014,431, filed in the names of Epperly and Sullivan on Feb. 13 1987, now U.S. Pat. No. 4,770,863; copending and commonly assigned U.S. patent application entitled "Process for Reducing Nitrogen Oxides in an Effluent Using a Hydrocarbon or Hydrogen Peroxide", Ser. No. 022,799, filed in the name of Sullivan on Mar. 6, 1987; copending and commonly assigned U.S. patent application entitled "Process for the Reduction of Nitrogen Oxides in an Effluent Using a Heterocyclic Hydrocarbon", Ser. No. 025,493, filed in the names of Epperly and Sullivan on Mar. 13, 1987; copending and commonly assigned U.S. patent application entitled "Process for the Reduction of Nitrogen Oxides in an Effluent Using Sugar", Ser. No. 025,350, filed in the names of Epperly and Sullivan on Mar. 13, 1987; and copending and commonly assigned U.S. patent application entitled "Process for the Reduction of Nitrogen Oxides in an Effluent", Ser. No. 108,779, filed in the names of Epperly, Sullivan and Sprague on Oct. 14, 1987, the disclosures of which are incorporated herein by rference.

As used in this description, the term "oxygenated hydrocarbon" refers to a hydrocarbon which contains oxygen or an oxygen-containing group; the term "alcohol" refers to a hydrocarbon derivative in which one or more hydrogen atoms have been replaced by a hydroxy group; the term "sugar" refers to a number of useful saccharide materials which are capable of decreasing the ammonia concentration in an effluent under conditions as described herein, including non-reducing and reducing water soluble mono-saccharides and the reducing and non-reducing polysaccharides and their degradation products, such as pentoses including aldopentoses, methyl pentoses, keptopentoses like xylose and arabinose, deoxyaldoses like rhaminose, hexoses and reducing saccharides such as aldo hexoses like glucose, galactose and mannose, ketohexoses like fructose and sorbose, disaccharides like lactose and maltose, non-reducing disaccharides like sucrose and other polysaccharides such as dextrin and raffinose, hydrolyzed starches which contain as their constituents oligosaccharides, and water dispersible polysaccharides.

The non-nitrogenous treatment agent is introduced into the effluent so as to interact with ammonia which is present in the effluent regardless of the source, whether generated by the combustion of the carbonaceous fuel or generated by or remaining after the introduction into the effluent of one or more nitrogenous compositions utilized for the reduction of pollutants such as nitrogen oxides in the effluent, and thereby perform ammonia scrubbing.

The conditions under which ammonia scrubbing occurs by the introduction of the non-nitrogenous treatment agent include the effluent temperature at the point of introduction of the non-nitrogenous treatment agent. Preferably, such effluent temperature is about 1350° F. to about 2000° F., more preferably about 1350° F. to about 1950° F. and most preferably about 1425° F. to about 1800° F., to perform ammonia scrubbing.

The non-nitrogenous treatment agent is preferably used in solution, dispersions, mixtures or emulsions, most preferably wherein the solvent is water, due to the economy of thereof, although there may be instances where other solvents including gaseous carriers may be advantageously used, either alone or in combination with water, as would be known to the skilled artisan. Moreover, solutions, dispersions, mixtures and emulsions comprising the non-nitrogenous treatment agent can further comprise other effluent treatment compositions, as desired, although nitrogen-containing compositions should be avoided or minimized. The concentration of the non-nitrogenous treatment agent in solution (the term "solution" as used herein will also be taken to refer to dispersions, mixtures and emulsions) comprises another condition under which ammonia scrubbing occurs. The concentration of non-nitrogenous treatment agent in the solution is preferably at least about 1%, up to about 50% by weight and higher. Most preferably, the concentration of the non-nitrogenous treatment agent in the solution is about 10% to about 40% by weight.

Preferably, the non-nitrogenous treatment agent is employed at a weight ratio of non-nitrogenous treatment agent to the ammonia level of about 2:1 to about 200:1, most preferably about 5:1 to about 125:1. The exact amount of non-nitrogenous treatment agent employed may vary depending upon the overall economics of the process. Advantageously, the non-nitrogenous treatment agent solution is introduced in the effluent to provide a volume ratio of non-nitrogenous treatment agent to effluent of about 0.000002:1 to about 0.0005:1, most preferably about 0.000004:1 to about 0.0002:1. The volume ratio of non-nitrogenous treatment agent to effluent is calculated based on the vaporized volume of the non-nitrogenous treatment agent (it will be recognized that upon introduction of a treatment agent into an effluent at the temperatures discussed herein, vaporization of the treatment agent occurs extremely rapidly).

The non-nitrogenous treatment agent is preferably introduced into the effluent at a number of spaced positions within the temperature zone from nozzles or other apparatus which are effective to uniformly form and disperse droplets of the non-nitrogenous treatment agent, either alone or in a dispersion or solution as discussed above, within the flowing effluent stream to achieve uniform mixing, especially with the effluent ammonia.

Both the concentration of the non-nitrogenous treatment agent in the solution and the weight ratio of treatment agent to ammonia are important to the practice of this invention. It has been found that the ammonia scrubbing obtained by using the rate of introduction of the non-nitrogenous treatment agent to create an equivalent weight ratio of treatment agent to effluent ammonia after a decrease in the treatment agent concentration will not correspond to that achieved with the original treatment agent concentration. For instance, if the desired weight ratio of treatment agent to effluent ammonia is 75 and the desired treatment agent concentration is 40%, halving the treatment agent concentration (to 20%) and doubling the rate of introduction of the treatment agent solution to thereby provide the equivalent weight ratio of treatment agent to effluent ammonia does not necessarily create an equivalent ammonia scrubbing effect. This is probably due to the quenching and microcooling (i.e., cooling of the microenvironment of the treatment agent in the effluent) effect caused by the additional solvent. In certain cases, though, the use of dilute treatment agent solutions with higher rates of introduction are desired to maximize ammonia scrubbing. For instance, when the effluent temperature where the non-nitrogneous treatment agent is to be introduced is in the higher portion of the preferred range, i.e., about 1600° F. and higher, lowering the concentration of the treatment agent and increasing the introduction rate can sometimes provide better ammonia scrubbing, because the quenching or microcooling effects can function to cause the resulting non-nitrogenous treatment agent/ammonia combination to be brought up to the plateau of its nitrogen oxides reduction versus effuent temperature curve from the right hand slope of the curve, as will be discussed in more detail below.

The effluent from the combustion of a carbonaceous fuel into which the non-nitrogenous treatment agents disclosed herein according to the present invention are introduced is preferably oxygen-rich, meaning that there is an excess of oxygen in the effluent. Advantageously, the excess of oxygen is less than about 10% by volume. Most preferably, the excess of oxygen is in the range of about 1% to about 10% by volume, although the effluent oxygen level is not critical to the successful practice of this invention.

Although the exact mechanism by which ammonia scrubbing occurs is not fully understood, it is believed to be analagous to practice on the right side of the nitrogen oxides reduction versus effluent temperature curve for the non-nitrogenous treatment agent combination. Ammonia is activated by the presence of the non-nitrogenous treatment agent to react with nitrogen oxides to form nitrogen gas and water. Although nitrogen oxides reduction does not correspond precisely to ammonia scrubbing, operation on the right side of the non-nitrogenous treatment agent/ammonia combination nitrogen oxides reduction versus effluent temperature curve results in reductions of the effluent ammonia and nitrogen oxides levels.

For the purposes of this description, the term "nitrogen oxides reduction versus effluent temperature curve" refers to a plot of the data points generated when a treatment regimen is effected by introducing a treatment agent into an effluent to achieve nitrogen oxides reduction over a range of effluent temperatures and the nitrogen oxides reduction at each introduction temperature is measured (and usually expressed in terms of percent of baseline).

As used herein, the term "high temperature side" or "right side" refer to any point on the subject nitrogen oxides reduction versus effluent temperature curve which represents the reduction achieved when a treatment regimen is effected at a higher temperature than the original temperature at which the treatment regimen was effected.

As used in this description, the term "curve plateau" refers to that region of a nitrogen oxides reduction versus effluent temperature curve where the $NO_x$ reduction is substantially maximized over a range of temperatures and preferably encompasses at least two data points (of course a skilled artisan will recognize that a curve plateau will not necessarily be flat due to "data scatter" and other practical data generation effects).

As noted, the non-nitrogenous treatment agent is introduced into the effluent so as to facilitate the reaction of ammonia which is present in the effluent. Ammonia existing at the effluent temperatures at which the non-nitrogenous treatment agent is introduced is at the left side of its nitrogen oxides reduction versus effluent temperature curve. The introduction of the non-nitrogenous treatment agent is performed so that the resulting regimen (i.e., that of the non-nitrogenous treatment agent in combination with the ammonia) is effected further toward the right side of its nitrogen oxides reduction versus effluent temperature curve than the ammonia was or would have been operating prior to the introduction of the non-nitrogenous treatment agent or had the non-nitrogenous treatment agent not been introduced at all, and, most preferably, the resulting treatment regimen is effected as far towards the right side of its curve plateau as possible. In short, introduction of the non-nitrogenous treatment agent is believed to function to substitute a nitrogen oxides reduction versus effluent temperature curve which is "shifted" from that of the ammonia nitrogen oxides reduction versus effluent temperature curve.

Operation on the right (or high temperature) side of the nitrogen oxides reduction versus effluent temperature curve of the non-nitrogenous treatment agent/ammonia treatment regimen substantially reduces the presence of ammonia. In addition, the effluent nitrogen oxides concentration is reduced.

Advantageously, the introduction of the non-nitrogenous treatment agent can be made as a component of a multiple stage introduction process for the reduction of a pollutant such as nitrogen oxides while minimizing ammonia breakthrough. Such a process is disclosed in copending and commonly assigned U.S. patent application entitled "Multi-Stage Process for Reducing the Concentration of Pollutants in an Effluent", Ser. No. 022,716, filed in the names of Epperly, Peter-Hoblyn, Shulof, Jr. and Sullivan on Mar. 6, 1987 now U.S. Pat. No. 4,777,024, the disclosure of which is incorporated herein by reference.

It has been found that nitrogen oxides reduction can be improved by increasing the amount of reductant chemical employed in the treatment agent. However, a point is reached in the introduction of nitrogenous treatment agents such as urea where emissions of ammonia are experienced. This limits the amount of nitrogen oxides control possible in any one treatment step in jurisdictions where ammonia control is necessary or in situations where ammonia control is desirable.

Moreover, it is not possible to introduce chemicals in every location in a boiler, because of design considerations. The introduction must occur in a location where space is availalle inside the boiler for distribution of chemicals. Introduction directly on heat exchange tubes could lead to harmful deposits and ineffective use of chemicals. As a practical matter, adequate space for introduction may typically exist in a boiler at two to four locations, and these will be at different temperatures because of the heat transfer taking place.

In the practice of this invention, nitrogen oxides reduction with concomitant ammonia control is achieved by selecting the locations at which introduction is possible, formulating nitrogenous treatment agents that are effective at reducing the nitrogen oxides level in the effluent at the temperature at any of the locations available for treatment agent introduction, and introducing the nitrogenous treatment agent(s) at each available location to obtain, and most preferably to maximize, nitrogen oxides reduction with greater tolerance for ammonia level or ammonia breakthrough ("ammonia breakthrough" is a term used in the art which refers to the point where a significant increase in the $NH_3$ concentration with rate of introduction is observed). A non-nitrogenous treatment agent is then introduced downstream from the introduction of the nitrogenous treatment agent(s) to facilitate reaction of the ammonia generated as a result of or present after the introduction of the nitrogenous treatment agent(s) under the conditions described above so as to function or operate further toward the right side of the non-nitrogenous treatment agent/ammonia nitrogen oxides reduction versus effluent temperature curve than the ammonia would have functioned on its nitrogen oxides reduction versus effluent temperature curve had the non-nitrogenous treatment agent not been introduced, to thereby perform ammonia scrubbing. Thus, this invention can be used to maximize nitrogen oxides reduction while also controlling the amount of ammonia presen in the post-treatment effluent.

Operation on the right (or high temperature) side of the nitrogen oxides reduction versus effluent temperature curve of the non-nitrogenous treatment agent/ammonia treatment regimen substantially reduces the presence of ammonia in the effluent, as discussed above, while at the same time it provides further reductions in nitrogen oxides concentration in the effluent. In other words, it leads to greater treatment agent utilization since the generation of ammonia by the introduction of the nitrogenous treatment agent(s) evidences incomplete utilization of the nitrogenous treatment agent(s).

Advantageously, the nitrogenous treatment agents to be introduced are preferably chosen to be most effective at the effluent temperatures existing within the zones in which they are to be introduced. For instance, if the first available temperature zone for introduction is in an upstream location comprising a temperature zone where the effluent temperature is in the range of about 1700° F. to about 2100° F. and above, the treatment agent can be chosen to be that which is most effective in that temperature range, such as an aqueous solution of urea, as disclosed by Arand et al. in U.S. Pat. Nos. 4,208,386 and 4,325,924, the disclosures of which are incorporated herein by reference; as well as those nitrogenous treatment agent disclosed by copending and commonly assigned U.S. patent application entitled "Reduction of Nitrogen- and Carbon-Based Pollutants", Ser. No. 906,671, filed in the name of Bowers on Sept. 10, 1986, now U.S. Pat. No. 4,719,092; copending and commonly assigned U.S. patent application entitled "Process for the Reduction of Nitrogen Oxides in an Effluent Using a Hydroxy Amino Hydrocarbon", Ser. No. 039,013, filed in the names of Sullivan and Epperly on Apr. 15, 1987; copending and commonly assigned U.S. patent application entitled "Reduction of Nitrogen- and Carbon-Based Pollutants Through the Use of Urea Solutions", Ser. No. 090,417, filed in the name of Bowers on August 27, 1987; copending and commonly assigned U.S. patent application entitled "Process for the Reduction of Nitrogen Oxides in an Effluent", Ser. No. 090,962, filed in the names of Epperly, Sullivan and Sprague on Aug. 28, 1987; and copending and commonly assigned U.S. patent application entitled "Process for the Reduction of Nitrogen Oxides in an Effluent", Ser. No. 100,128, filed in the names of Epperly, Sullivan and Sprague on Sept. 23, 1987, the disclosures of which are incorporated herein by reference, or an aqueous solution of ammonia, or gaseous ammonia itself, as disclosed by Lyon in U.S. Pat. No. 3,900,554, the disclosure of which is incorporated herein by reference.

The terms urea and ammonia as employed in this description include the compounds urea and ammonia themselves, as well as compounds equivalent in effect. Among those compounds are ammonium carbonate, ammonium formate, ammonium oxalate, ammonium hydroxide and various stable amines, and their solutions in water.

If the geometry of the boiler permits, two nitrogenous treatment agent introductions can be made in an upstream location. The first can be further upstream in a temperature zone where the effluent temperature is about 1850° F. to about 2100° F. and the second at a location downstream from the first location in a temperature zone where the effluent temperature is about 1700° F. to about 1850° F. As indicated by the referenced disclosures, the urea or ammonia solution can be more concentrated (e.g., about 20% to about 50% urea or ammonia by weight) in the lower temperature location and more dilute (e.g., about 1% to about 20% urea or ammonia by weight) in the higher temperature location. It will of course be recognized that ammonia can be also introduced in a carrier gas.

Appropriate temperature zones for nitrogenous treatment agent introduction according to the present invention may also be found downstream from the zones discussed above, where the effluent temperature is in the range of about 1350° F. to about 1750° F. Suitable nitrogenous treatment agents in addition to those disclosed above (with and/or without hydrocarbon treatment agent enhancers) for introduction into a temperature zone having uuch effluent temperatures are dislosed in copending and commonly assigned U.S. patent application entitled "Reduction of Nitrogen-Based Pollutants Through the Use of Urea Solutions Containing Oxygenated Hydrocarbon Solvents", Ser. No. 784,828, filed in the name of Bowers on Oct. 4, 1985, now U.S. Pat. No. 4,751,065; copending and commonly assigned U.S. patent application entitled "Reduction of Nitrogen-and Carbon-Based Pollutants", Ser. No. 906,671, filed in the name of Bowers on Sept. 10, 1986, now U.S. Pat. No. 4,751,065; copending and commonly assigned U.S. patent application entitled "Process for the Reduction of Nitrogen Oxides in an Effluent", Ser. No. 014,431, filed in the names of Epperly and Sullivan on Feb. 13, 1987, now U.S. Pat. No. 4,770,863; copending and commonly assigned U.S. patent application entitled "Process for the Reduction of Nitrogen Oxides in an Effluent Using a Heterocyclic Hydrocarbon", Ser. No. 025,493, filed in the names of Epperly and Sullivan on Mar. 13, 1987; copending and commonly assigned U.S. patent application entitled "Process for the Reduction of Nitrogen Oxides in an Effluent Using Sugar", Ser. No. 025,350, filed in the names of Epperly and Sullivan on Mar. 13, 1987; copending and commonly assigned U.S. patent application entitled "Process for the Reduction of Nitrogen Oxides in an Effluent Using a Hydroxy Amino Hydrocarbon", Ser. No. 039,013, filed in the names of Sullivan and Epperly on Apr. 15, 1987; copending and commonly assigned U.S. patent application entitled "Process for the Reduction of Nitrogen Oxides in an Effluent", Ser. No. 090,962, filed in the names of Epperly, Sullivan and Sprague on Aug. 28, 1987; copending and commonly assigned U.S. patent application entitled "Process for the Reduction of Nitrogen Oxides in an Effluent", Ser. No. 100,128, filed in the names of Epperly, Sullivan and Sprague on Sept. 23, 1987; copending and commonly assigned U.S. patent application entitled "Process for the Reduction of Nitrogen Oxides in an Effluent", Ser. No. 108,779, filed in the names of Epperly, Sullivan and Sprague on Oct. 14, 1987, the disclosures of which are incorporated herein by reference. The disclosed treatment agents include aqueous solutions of ammonia or urea, enhanced with suitable enhancers such as hexamethylenetetraamine (HMTA), furfural, sugar, molasses, monoethanolamine, ammonium acetate, pyridine and/or ethylene glycol and mixtures thereof.

According to the present invention, a non-nitrogenous treatment agent is preferably introduced into the effluent at a temperature zone wherein the effluent temperature will be within the range of about 1350° F. to about 2000° F., provided that the non-nitrogenous treatment agent is introduced downstream from all nitrogenous treatment agents which are introduced.

By prior knowledge of the nitrogen oxides reduction versus effluent temperature curve for the non-nitrogenous treatment agent when in combination with ammonia and the effluent temperature at which the non-nitrogenous treatment agent is to be introduced, it can be determined which non-nitrogenous treatment agents, when introduced to combine with the effluent ammonia, operate further to the right on their respective nitrogen oxides reduction versus effluent temperature curve than the effluent ammonia does on its nitrogen oxides reduction versus effluent temperature curve. In fact, the non-nitrogenous treatment agent which provides a nitrogen oxides reduction versus effluent temperature curve in combination with ammonia furthest to the right can be determined and it is that non-nitrogenous treatment agent which would be most effective for minimizing the ammonia concentration in the effluent.

Although this description is written in terms of nitrogen oxides reduction and ammonia scrubbing in a suspension-fired boiler, the description should be understood to be equally applicable to other types of units such as circulating fluidized bed boilers firing a variety of fuels including refuse.

BEST MODE FOR CARRYING OUT THE INVENTION

The following example further illustrates and explains the invention by detailing the operation of a process for ammonia scrubbing.

EXAMPLE I

The burner used in this example is a burner having an effluent flue conduit, known as a combustion tunnel, approximately 209 inches in length and having an internal diameter of 8 inches and walls 2 inches thick. The burner has a flame area adjacent the effluent entry port and flue gas monitors adjacent the effluent exit port to measure the concentration of compositions such as ammonia, nitrogen oxides, sulfur oxides, carbon monoxide, carbon dioxide, percent excess oxygen and other compounds of interest which may be present in the effluent. The effluent flue conduit additionally has thermocouple ports for temperature measurement at various locations. The temperature of the effluent into which the treatment agents are introduced is measured at the point of introduction utilizing a K-type thermocouple. Atomizing injectors described in copending and commonly assigned U.S. patent application entitled "Process and Apparatus for Reducing the Concentration of Pollutants in an Effluent", Ser. No. 009,696, filed in the name of Burton on Feb. 2, 1987, the disclosure of which is incorporated herein by reference, are positioned through ports in the effluent flue conduit in order to introduce and distribute the $NO_x$-reducing agents into the effluent stream. The burner fuel is a Number 2 fuel oil, and the burner is fired at a rate of 9.0 lbs/hr to 11.7 lbs/hr.

Baseline ammonia and nitroge oxides concentration readings are taken prior to beginning each run to calculate the ratio of agents introduced and to facilitate the calculation of the reduction in ammonia and nitrogen oxides concentration, and ammonia and nitrogen oxides concentration readings are taken during introduction of each of the treatment agents to calculate the reduction in the ammonia and nitrogen oxides concentrations in the effluent elicited by each of the agents introduced.

Each run comprises the several introductions of a treatment agent at a rate of introduction of 300 ml/hr and at a certain specific effluent temperature with varying treatment agent concentration, weight ratio of treatment agent to baseline effluent ammonia concentration and volume ratio of treatment agent to effluent. The treatment agent concentration, weight ratio of treatment agent to baseline effluent ammonia concentration (gm/gmNH3), volume ratio of treatment agent to effluent (vol/vol), baseline ammonia, final ammonia and percent reduction of ammonia for each run are set out in Table 1.

The following runs are made:

(1) The treatment agent comprises an aqueous solution comprising 19% of ethylene glycol and 72% of molasses and is introduced at an effluent temperature of 1410° F.;

(2) The treatment agent comprises an aqueous solution 19% of ethylene glycol and 72% of molasses and is introduced at an effluent temperature of 1430° F.;

(3) The treatment agent comprises an aqueous solution comprising 19% of ethylene glycol and 72% of molasses and is introduced at an effluent temperature of 1480° F.;

(4) The treatment agent comprises an aqueous solution comprising 19% of ethylene glycol and 72% of molasses and is introduced at an effluent temperature of 1530° F.; and (5) The treatment agent comprises an aqueous solution comprising 19% of ethylene glycol and 72% of molasses and is introduced at an effluent temperature of 1625° F.

TABLE 1

| Run | Treatment Agent Conc. | gm/gm NH3 | vol/vol (× 10+3) | NH3 Baseline | (ppm) Final | % Red. |
|---|---|---|---|---|---|---|
| 1 | 40% | 28.2 | 0.195 | 86 | 83 | 3.5 |
| 2 | 40% | 37.0 | 0.199 | 67 | 40 | 40.3 |
|   | 20% | 18.5 | 0.100 | 67 | 63 | 6.0 |
|   | 5%  | 4.6  | 0.025 | 67 | 69.5 | −3.7 |
|   | 1%  | 0.93 | 0.005 | 67 | 68 | −1.5 |
| 3 | 40% | 36.6 | 0.179 | 61 | 33 | 45.9 |
|   | 20% | 18.3 | 0.090 | 61 | 37 | 39.3 |
|   | 10% | 9.2  | 0.045 | 61 | 50 | 18.0 |
|   | 5%  | 4.6  | 0.022 | 61 | 54 | 11.5 |
|   | 1%  | 0.9  | 0.004 | 61 | 58 | 4.9 |
| 4 | 40% | 57.0 | 0.0174 | 38 | 14 | 63.2 |
|   | 20% | 28.5 | 0.087 | 38 | 18 | 52.6 |
|   | 10% | 14.3 | 0.044 | 38 | 22 | 42.1 |
|   | 5%  | 7.1  | 0.022 | 38 | 25 | 34.2 |
|   | 1%  | 1.4  | 0.004 | 38 | 38.5 | −1.3 |
| 5 | 40% | 194.0 | 0.156 | 10 | 6 | 40 |
|   | 20% | 97.0  | 0.078 | 10 | 5.5 | 45 |
|   | 10% | 48.5  | 0.039 | 10 | 5.5 | 45 |
|   | 5%  | 24.3  | 0.020 | 10 | 8 | 20 |
|   | 1%  | 4.9   | 0.004 | 10 | 8.5 | 15 |

Table 1 illustrates that the practice of the present invention leads to signifiant reductions in the ammonia concentration in the effluent from the combustion of a carbonaceous fuel.

The nitrogen oxides reductions achieved by performing the process described in Example I are set out in Table 2, with the corresponding ammonia reductions also set out.

TABLE 2

| Run | NH3 Baseline | (ppm) Final | % red. (NH3) | NOx Baseline | (ppm) Final | % red. (NOx) |
|---|---|---|---|---|---|---|
| 1 | 86 | 83 | 3.5 | 135 | 80 | 40.1 |
| 2 | 67 | 40 | 40.3 | 118 | 70 | 40.1 |
|   | 67 | 63 | 6.0 | 118 | 96 | 18.6 |
|   | 67 | 69.5 | −3.7 | 118 | 96 | 18.6 |
|   | 67 | 68 | −1.5 | 118 | 111 | 5.9 |
| 3 | 61 | 33 | 45.9 | 95 | 38 | 60.0 |
|   | 61 | 37 | 39.3 | 95 | 43 | 54.7 |
|   | 61 | 50 | 18.0 | 95 | 56 | 41.1 |
|   | 61 | 54 | 11.5 | 95 | 67 | 29.5 |
|   | 61 | 58 | 4.9 | 95 | 76 | 20.0 |
| 4 | 38 | 14 | 63.2 | 87 | 53 | 39.1 |
|   | 38 | 18 | 52.6 | 87 | 53 | 39.1 |
|   | 38 | 22 | 42.1 | 87 | 57 | 34.5 |
|   | 38 | 25 | 34.2 | 87 | 63 | 27.6 |
|   | 38 | 38.5 | −1.3 | 87 | 78 | 10.3 |
| 5 | 10 | 6 | 40.0 | 83 | 76 | 8.4 |
|   | 10 | 5.5 | 45.0 | 83 | 68 | 18.1 |
|   | 10 | 5.5 | 45.0 | 83 | 66 | 20.5 |
|   | 10 | 8 | 20.0 | 83 | 68 | 18.1 |
|   | 10 | 8.5 | 15.0 | 83 | 74 | 10.8 |

Table 2 clearly illustrates the nitrogen oxides reductions which can be achieved while ammonia scrubbing using the process of the present invention.

EXAMPLE II

The process of Example I is repeated except that runs are made employing the treatment agents described below. In each, a nitrogenous treatment agent is introduced into the effluent at the indicated temperature. The non-nitrogenous treatment agent is introduced into the effluent flue conduit at a position 43 inches downstream from the nitrogenous treatment agent introduction point. Nitrogen oxides and ammonia readings are taken after the introduction of the nitrogenous treatment agent but prior to introduction of the non-nitrogenous treatment agent and again after introduction of the non-nitrogenous treatment agent.

A baseline nitrogen oxides concentration reading is taken prior to beginning each run to calculate the ratio of agents introduced and to facilitate the calculation of the reduction in nitrogen oxides concentration, and a nitrogen oxides reading is taken during introduction of each of the treatment agents to calculate the reduction in the nitrogen oxides concentration in the effluent elicited by each of the agents introduced.

The following runs are made:

(1) An aqueous solution comprising 10% by weight of urea is introduced as the nitrogenous treatment agent at a rate of 300 ml/hr. into the effluent which is at a temperature of 1840° F. (run 1a); and an aqueous solution comprising 40% by weight of an aqueous solution comprising 19% of ethylene glycol and 72% of molasses is introduced as the non-nitrogenous treatment agent at a rate of 300 ml/hr. into the effluent which is at a temperature of 1540° F. (run 1b).

(2) An aqueous solution comprising 5% by weight of urea is introduced as the nitrogenous treatment agent at a rate of 300 ml/hr. into the effluent which is at a temperature of 1870° F. (run 2a); and an aqueous solution comprising 10% by weight of an aqueous solution comprising 19% of ethylene glycol and 72% of molasses is introduced as the non-nitrogenous treatment agent at a rate of 300 ml/hr. into the effluent which is at a temperature of 1640° F. (run 2b).

(3) An aqueous solution comprising 10% by weight of urea is introduced as the nitrogenous treatment agent at a rate of 300 ml/hr. into the effluent which is at a temperature of 1835° F. (run 3a); and an aqueous solution comprising 5% by weight of an aqueous solution comprising 19% of ethylene glycol and 72% of molasses is introduced as the non-nitrogenous treatment agent at a rate of 300 ml/hr. into the effluent which is at a temperature of 1570° F. (run 3b).

The results of the above-described runs are set out in Table 3.

TABLE 3

| Run | NO$_x$ Baseline ppm | NO$_x$ Final ppm | % reduction | NH$_3$ ppm |
|---|---|---|---|---|
| 1a | 199 | 88 | 55.8 | 42 |
| 1b | 199 | 49 | 75.4 | 14 |
| 2a | 213 | 148 | 30.5 | 4 |
| 2b | 213 | 142 | 33.3 | 2.2 |
| 3a | 157 | 95 | 39.5 | 18 |
| 3b | 157 | 76 | 51.6 | 15 |

It is clearly demonstrated in Table 3 that the process of this invention can be practice as an element of a multiple stage nitrogen oxides reducing process which permits the minimization of the concentration of nitrogen oxides in an effluent while simultaneously maintaining control over the ammonia concentration in the effluent.

The above description is for the purpose of teaching the person of ordinary skill in the art how to practice the present invention, and it is not intended to detail all of those obvious modifications and variations of it which will become apparent to the skilled worker upon reading the description. It is intended, however, that all such obvious modifications and variations be included within the scope of the present invention which is defined by the following claims.

We claim:

1. A process for reducing the concentration of ammonia in the effluent from the combustion of a carbonaceous fuel, the process comprising introducing a non-nitrogenous treatment agent which comprises a paraffinic, olefinic, aromatic oxygenated hydrocarbon into the effluent at a ratio of non-nitrogenous treatment agent to effluent ammonia of about 2:1 to about 200:1 to combine with ammonia present in the effluent, wherein the effluent temperature is about 1350° F. to about 2000° F. and further wherein said non-nitrogenous treatment agent is introduced under conditions effective to perform ammonia scrubbing.

2. The process of claim 1 wherein said non-nitrogenous treatment agent is introduced into the effluent to provide a vaporized volume ratio of non-nitrogenous treatment agent to the effluent of about 0.000002:1 to about 0.0005:1.

3. The process of claim 1 wherein said non-nitrogenous treatment agent is present in a solution, mixture, dispersion or emulsion.

4. The process of claim 3 wherein the solvent in said solution, mixture, dispersion or emulsion comprises water.

5. The process of claim 4 wherein said non-nitrogenous treatment agent is present in said solution, mixture, dispersion or emulsion at a concentration of about 1% to about 50% by weight.

6. The process of claim 1 wherein said conditions effective to perform ammonia scrubbing comprise introducing said non-nitrogenous treatment agent into the effluent to react with ammonia present in the effluent wherein the effluent temperature at said introduction is such that the resulting non-nitrogenous treatment agent/ammonia combination is operating further to the right on its nitrogen oxides reduction versus effluent temperatuee curve than the effluent ammonia was operating on its nitrogen oxides reduction versus effluent temperature curve.

7. The process of claim 1 wherein said oxygenated hydrocarbon is selected from the group consisting of alcohols, sugars, ketones, furfural and furfural derivatives, organic acids and salts thereof, esters, ethers and aldehydes.

8. The process of claim 7 wherein said oxygenated hydrocarbon is selected from the group consisting of ethylene glycol, methanol, molasses, sugar, acetone, methylethyl ketone, glycerol and fish oil, and mixtures thereof.

9. The process of claim 8 wherein said hydrocarbon comprises a mixture of ethylene glycol and sugar.

10. A process for reducing the concentration of ammonia in the effluent from the combustion of a carbonaceous fuel, the process comprising introducing an aqueous solution which comprises about 1% to about 50% of a non-nitrogenous treatment agent comprising a paraffinic, olefinic, aromatic or oxygenated hydrocarbon into the effluent to react with ammonia present in the effluent, wherein said non-nitrogenous treatment agent is introduced at an effluent temperature of about 1350° F. to about 2000° F. and a ratio of non-nitrogenous treatment agent to effluent ammonia of about 2:1 to about 200:1.

11. The process of claim 10 wherein the introduction of said non-nitrogenous treatment agent into the effluent to react with ammonia present in the effluent is under conditions such that the resulting non-nitrogenous treatment agent/ammonia combination is operating further to the right on its nitrogen oxides reduction versus effluent temperature curve than the effluent ammonia was operating on its nitrogen oxides reduction versus effluent temperature curve.

12. The process of claim 11 wherein the effluent temperature is about 1350° F. to about 1800° F.

13. The process of claim 10 wherein said oxygenated hydrocarbon is selected from the group consisting of alcohols, sugars, ketones, furfural and furfural derivatives, organic acids and salts thereof, esters, ethers and aldehydes.

14. The process of claim 13 wherein said oxygenated hydrocarbon is selected from the group consisting of ethylene glycol, methanol, molasses, sugar, acetone, methylethyl ketone, glycerol and fish oil, and mixtures thereof.

15. The process of claim 14 wherein said hydrocarbon comprises a mixture of ethylene glycol and sugar.

16. A process for reducing the concentration of ammonia in the effluent from the combustion of a carbonaceous fuel while concomitantly reducing the concentratinn of nitrogen oxides in the effluent, the process comprising:

a. introducing a nitrogenous treatment agent into the effluent at a first nitrogenous treatment agent temperature zone under conditions effective to reduce the concentration of nitrogen oxides in the effluent; and b. introducing a non-nitrogenous treatment agent comprising a paraffinic, olefinic, aromatic or oxygenated hydrocarbon into the effluent at a temperature zone downstream from said first nitrogenous treatment agent temperature zone wherein the temperature at said downstream temperature zone is about 1350° F. to about 1800° F. to combine with ammonia present in the effluent after introduction of said nitrogenous treatment agent at a weight ratio of non-nitrogenoua treatment agent to effluent ammonia of about 2:1 to about 200:1, wherein said non-nitrogenous treatment agent is introduced under conditions effective to perform ammonia scrubbing.

17. The process of claim 16 wherein said non-nitrogenous treatment agent is introduced into the effluent to provide a weight ratio of non-nitrogenous treatment agent to effluent ammonia of about 2:1 to about 200:1.

18. The process of claim 16 wherein said non-nitrogenous treatment agent is introduced into the effluent to provide a vaporized volume ratio of non-nitrogenous treatment agent to the effluent of about 0.000002:1 to about 0.0005:1.

19. The process of claim 16 wherein said non-nitrogenous treatment agent is present in a solution, mixture, dispersion or emulsion.

20. The process of claim 19 wherein the solvent in said solution, mixture, dispersion or emulsion comprises water.

21. The process of claim 20 wherein said non-nitrogenous treatment agent is present in said solttion, mixture, dispersion or emulsion at a concentration of about 1% to about 50% by weight.

22. The process of claim 16 wherein said conditions effective to perform ammonia scrubbing comprise introducing said non-nitrogenous treatment agent into the effluent to react with ammonia present in the effluent wherein the effluent temperature at said introduction is such that the resulting non-nitrogenous treatment agent/ammonia combination is operating further to the right on its nitrogen oxides reduction versus effluent temperature curve than the effluent ammonia was operating on its nitrogen oxides reduction versus effluent temperature curve.

23. The process of claim 16 wherein said oxygenated hydrocarbon is selected from the group consisting of alcohols, sugars, ketones, furfural and furfural derivatives, organic acids and salts thereof, esters, ethers and aldehydes.

24. The process of claim 23 wherein said oxygenated hydrocarbon is selected from the group consisting of ethylene glycol, methanol, molasses, sugar, acetone, methylethyl ketone, glycerol and fish oil, and mixtures thereof.

25. The process of claim 24 wherein said hydrocarbon comprises a mixture of ethylene glycol and sugar.

* * * * *

UNITED STATES PATENT AND TRADEMARK OFFICE
CERTIFICATE OF CORRECTION

PATENT NO. : 4,830,839

DATED : May 16, 1989

INVENTOR(S) : Epperly, Peter-Hoblyn and Sullivan

It is certified that error appears in the above—identified patent and that said Letters Patent is hereby corrected as shown below:

Title page, item [63]: "Continuation-in-part of Ser. No. 50,198, May 14, 1987, Pat. No. 4,780,289" should read "Continuation-in-part of Ser. No. 50,198, May 14, 1987, Pat. No. 4,780,289; Ser. No. 22,716, March 6, 1987, Pat. No. 4,777,024; and Ser. No. 14,431, February 13, 1987, Pat. No. 4,770,863."

On the title page, insert --Foreign Patent Documents
5499773  8/1979  Japan
5549130  4/1980  Japan--.

Signed and Sealed this

Twenty-first Day of August, 1990

Attest:

HARRY F. MANBECK, JR.

Attesting Officer    Commissioner of Patents and Trademarks